United States Patent Office 3,414,385
Patented Dec. 3, 1968

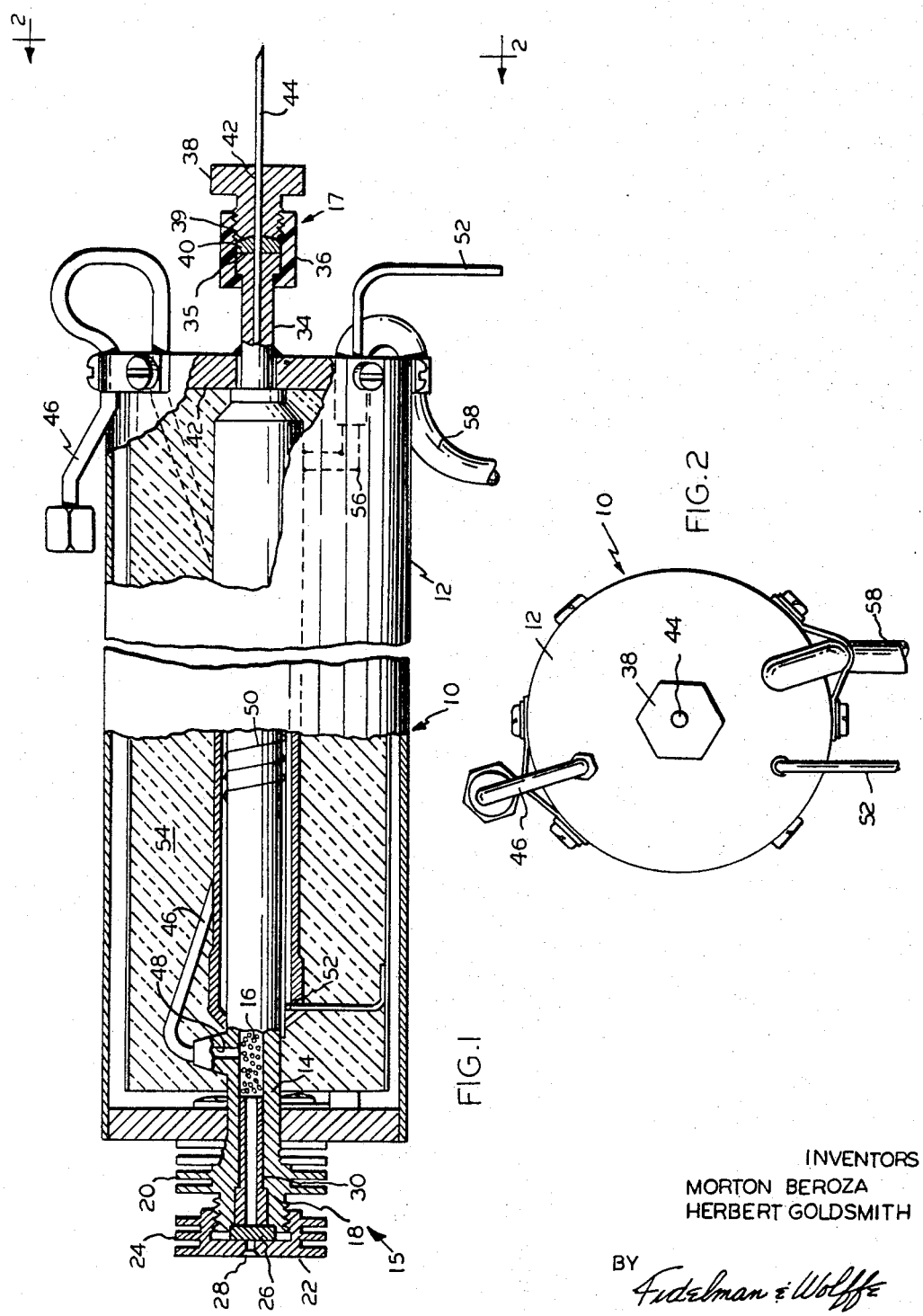

3,414,385
CARBON SKELETON DETERMINATOR
Morton Beroza, 821 Malta Lane, Silver Spring Md.
20901, and Herbert Goldsmith, c/o National Instrument Labs, Inc., 12300 Parklawn Drive, Rockville, Md. 20852
Filed Feb. 7, 1964, Ser. No. 343,250
5 Claims. (Cl. 23—288)

ABSTRACT OF THE DISCLOSURE

The invention relates to chromatography and constitutes a catalyst filled tube heated by a heating element. A hydrogen supply line passes adjacent the catalyst tube and is also heated by the element, so that preheated hydrogen passes through the catalyst tube. A charging port is provided so that a sample to be hydrogenated may be introduced therethrough directly to the heated catalyst.

The present invention relates to an improved apparatus that is capable of being employed to identify from even microgram amounts the carbon skeleton and other structural features of a wide variety of organic compounds.

A non-exclusive, irrevocable, royalty-free license in the invention herein described, throughout the world for all purposes of the United States Government, with the power to grant sublicenses for such purposes, is hereby granted to the Government of the United States of America.

It is know that sulphur, nitrogen, oxygen, and halogen atoms can be cleaved from carbon atoms being replaced with hydrogen atoms, and that unsaturated bonds can be saturated quickly. For analytical purposes the hydrogenation and hydrogenolysis reactions can be effected in a heated aluminum reaction tube packed with a catalyst, by contacting a small quantity of the compound to be analyzed with the catalyst and a stream of hydrogen. The hydrocarbons and other reaction products are swept along in the hydrogen to a chromatographic separation column and are identified according to conventional practice in the chromatography art.

Prior application Ser. No. 233,979, filed October 29, 1962, now U.S. Patent, 3,230,046, issued Jan. 18, 1966, discloses a chromatographic separation system containing a catalyst tube structure specifically adapted to provide rapid hydrogenation and hydrogenolysis of an analytic sample. However, the catalyst tube structure disclosed in the aforementioned application has been found disadvantageous in its provisions for introducing thereto the hydrogen stream and the sample to be hydrogenated or hydrogenolyzed. Essentially the difficulties which have arisen are attributable to the effects of elevated temperatures on the injection port and on the sample. If the entire sample is contacted with heated hydrogen and the catalyst simultaneously, and reacts to the desired extent, the hydrocarbon product is volatilized as a unitary means so to speak and moves out of the catalyst chamber into the chromatographic column en masse. In the chromatographic column a clean separation is effected and very sharp peaks will be obtained from the elution product, thereby facilitating analysis of the original sample. The desired reaction requires that the hydrogen and sample not deviate appreciably from the uniform temperature level maintained in the heated catalyst tube. If some of the original nonvolatile charge has a finite residence time in the catalyst chamber in an unreacted state (during which period the carrier hydrogen is heating to reaction temperature), the reaction products spread out in the carrier hydrogen; the peaks obtained from the elution products of the chromatographic separation tend to broaden and be delayed, thereby obscuring the analytical results. Thus, introduction of a relatively cold stream of hydrogen along with the sample tends to slow down catalytic reduction of the sample, and in consequence the chromatographic separation is less precise.

According to the practice of the present invention, provision is made for preheating the hydrogen prior to mixing same with the sample to be reacted in the heated catalytic chamber.

A related facet of the temperature effect problem is presented by the need to seal the catalyst tube at the entrance and exit ports thereof, yet provide a structure which will allow introduction of the sample and removal of the reaction products. The entrance port structure in particular has caused some difficulty. Normally the entrance port of the catalyst tube is closed off by a self-sealing rubbery barrier made of silicone rubber. This barrier, termed a septum, can be readily pierced by a hypodermic needle. Use of a septum permits introduction of a liquid sample (or if the sample is solid, as a solution in a solvent which will not interfere with the subsequent chromatographic separation) by hypodermic syringe injection directly onto the catalyst bed. The septum seals itself upon withdrawal of the needle. Since it is in close proximity therewith, the septum must be capable of withstanding virtually the operating temperature of the catalyst bed. Unfortunately, the rubbers available have not proven to be sufficiently temperature resistant, and in practice the septum must be replaced frequently, sometimes after only several hours of operation. Related to the problem of septum life is contamination of the catalyst by the decomposition products from the septum bleeding through to the catalyst chamber. On occasion the analytical results are affected. It has now been found that providing a cooling fin arrangement on the inlet port structure causes sufficient heat loss to cool the septum significantly. This cooling effect has been found sufficient to extend the septum life tremendously, e.g., to several days of operation. Catalyst contamination is reduced substantially.

In passing it is noted that the present catalyst tube is accessory to chromatographic separation columns, being employed only on occasion. Therefore the exit port structure must allow for ready attachment and detachment from chromatographic columns. For this purpose the present catalyst tube incorporates a needle termination outlet port structure which can fit virtually every gas chromatographic apparatus, thereby avoiding the need for special fittings which might vary from chromatograph to chromatograph of different manufacture.

For further understanding of the present invention reference is now made to the attached drawing wherein:

FIGURE 1 shows, partially in section, the present catalyst containing tube structure; and FIGURE 2 is an end view of the exit port side taken along line 2—2 of FIGURE 1.

The overall structure 10 comprises a housing 12 in which is axially disposed a tube 14. Terminal portions of tube 14 extend beyond the confines of housing 12 to form part of charging port 15 and exit port end 17. The inside of tube 14 is normally packed with a mass 16 of particulate catalyst, the catalyst being of the nature described and disclosed in prior application Ser. No. 233,979, filed Oct. 29, 1962.

As shown in the drawing the terminal portion 18 of catalyst tube 14 at charging port 15 has integrally formed on the periphery thereof a plurality of cooling fins 20 (four being illustratively shown). A metallic end cap 22 threaded onto terminal end portion 18 of tube 14 also has cooling fins 24 welded or otherwise integrally formed on the periphery thereof. Cooling fins 20 and 24 cool the septum 26 which is seated between cap 22 and tube 14 as has been illustrated in FIGURE 1. A central aperture 28 is provided in cap 22 so that a hypodermic needle (not shown) can be inserted through cap 22 and pierce septum 26 for the purpose of depositing a sample to be analyzed directly on the catlayst mass 16 inside tube 14. An internal spacer 30 disposed inside the catalyst tube 14 serves as a partial seat for septum 26 as illustrated in FIGURE 1. However, the principal purpose served by spacer 30 is to fill up the otherwise empty volume at the inlet port 15 and confine the catalyst mass 16 strictly to the heated region of tube 14 inside housing 12.

It should be noted that metal, usually aluminum, is employed to fabricate all portions of tube 14; fins 20, 24; cap 22; and spacer 30. As has been previously indicated, septum 26 is customarily formed from a high grade of silicone rubber.

The needle termination structure shown in FIGURE 1 has been found most advantageous since it adapts the present catalyst tube structure 10 to almost all chromatographic separation columns. The outlet port 17 is formed by a reduced diameter terminal end portion 34 on catalyst tube 14. Portion 34 may be welded or otherwise made to form an extension of tube 14 beyond the confines of housing 12. A nut 36 is disposed on end portion 34. A plug 38 threads into nut 34 seating a septum 40 between opposing faces 35 and 39 on end portion 34 and plug 38. Aperture 42 in plug 38 together with the reduced diameter cylindrical passage of end portion 34 provides the outlet passageway from the catalyst mass in tube 14. A hollow needle 44 piercing septum 40 occupies the outlet passageway; the self-sealing nature of the (silicone rubber) septum material seals needle 44. It may be noted that the conical face 39 on plug 38 exerts both axial and radial forces on septum 40 to help seal needle 44 against leakage. The needle termination structure of the outlet port 17 can be plugged directly into chromatograph separation columns of virtually all makes.

The gaseous hydrogen which serves to hydrogenolyze the sample and as carrier gas for the subsequent chromatographic separation is introduced into catalyst tube assembly 10 from an outside source (suitably a conventional cylinder, not shown) by way of hydrogen supply line 46. As shown in the drawing, line 46 enters housing 12 through a suitable aperture in the outlet port side end plate 48. Inside housing 12 hydrogen supply line 46 is wrapped once or twice around the catalyst tube 14 before terminating at an opening in tube 14 adjacent the charging port end of housing 12. Hydrogen passing through line 46 becomes preheated virtually to the temperature of catalyst mass 16 prior to leaving feed line 46.

The further structure inside of housing 12 are: electrical heating element 50, thermocouple 52, and insulation 54. Desirably, heating element 50 is a conventional nickel chromium resistance wire (e.g., Nichrome V) wrapped around catalyst tube 14 to form a heating coil disposed between tube 14 and supply line 46. Terminals 56 provide attachment thereto for power supply line 58. Appropriate insulation is provided to electrically separate heating element 50 from tube 14 and hydrogen supply line 46.

The above description of the present invention is intended to be illustrative rather than limiting, and it should be understood that variations may be made by those skilled in the art without departing from the basic concepts of the invention and the following claims.

What is claimed is:

1. An accessory for chromatographic separation systems comprising: a tube containing catalyst; a heating element in close proximity thereto for heating the tube; a charging port and an outlet port at the ends of the tube; and a supply line for hydrogen, said supply line passing adjacent the tube and the heating element to a termination on the tube adjacent the charging port, whereby preheated hydrogen can enter the tube to react with a sample introduced through the charging port, and transport the reaction products through the tube, the charging port being formed by a terminal portion of the tube extending beyond the heating element, said terminal portion having on the outer periphery thereof a plurality of cooling fins formed integrally therewith, a self-sealing septum on said terminal portion closing off the tube, and an apertured retaining member having on the periphery thereof a plurality of cooling fins formed integrally therewith, said retaining member fixing the septum in its closing off relation to the tube, whereby for purposes of charging a sample to the tube, a hypodermic needle may be inserted through the aperture of the retaining member and pierce the septum.

2. An accessory for chromatographic separation systems comprising: a tube containing catalyst; a heating element in close proximity thereto for heating the tube; a charging port and an outlet port at the ends of the tube; and a supply line for hydrogen, said supply line passing adjacent the tube and the heating element to a termination on the tube adjacent the charging port, whereby preheated hydrogen can enter the tube to react with a sample introduced through the charging port, and transport the reaction products through the tube, the charging port being formed by: a terminal portion of the tube extending beyond the heating element, said terminal portion having on the outer periphery thereof a plurality of cooling fins formed integrally therewith; a self-sealing septum on said terminal portion closing off the tube; and an apertured retaining member having on the periphery thereof a plurality of cooling fins formed integrally therewith, said retaining member fixing the septum in its closing off relation to the tube, whereby for purposes of charging a sample to the tube a hypodermic needle may be inserted through the aperture of the retaining member and pierce the septum, the outlet port being formed by: a terminal portion of the tube extending beyond the heating element; a self-sealing septum on said outlet terminal portion closing off the tube; an apertured retaining member fixing the septum in its closing off relation to the tube; and a hollow needle extending through the aperture of said outlet retaining member piercing the septum to provide a needle termination structure at the outlet port.

3. A catalyst tube assembly comprising: a tube containing catalyst; a housing surrounding the tube; a charging port and an outlet port on the tube, each port extending axially beyond the confines of said housing; a heating element inside said housing for heating the tube; and a hydrogen supply line entering said housing at the outlet port end and passing adjacent to the tube and heating element to a termination on the tube adjacent to the inlet port end of said housing, whereby preheated hydrogen can enter the tube to react with a sample and transport the reaction products through the tube, the charging port being formed by: a terminal portion of the tube extending beyond the confines of said housing, said terminal portion having on the outer periphery thereof a plurality of cooling fins formed integrally therewith; a self-sealing septum on said terminal portion closing off the tube; and an apertured retaining member having on the periphery thereof a plurality of cooling fins formed integrally therewith, said retaining member fixing the septum in its closing off relation to the tube, whereby for purposes of charging a sample to the tube, a hypodermic needle may be inserted through the aperture of the retaining member and pierce the septum.

4. A catalyst tube assembly comprising: a tube containing catalyst; a housing surrounding the tube; a charging port and an outlet port on the tube, each port extending axially beyond the confines of said housing; a heating element inside said housing for heating the tube; and a hydrogen supply line entering said housing at the outlet port end and passing adjacent to the tube and heating element to a termination on the tube adjacent to the inlet port end of said housing, whereby preheated hydrogen can enter the catalyst tube to react with a sample and transport the reaction products through the catalyst tube, the charging port being formed by: a terminal portion of the tube extending beyond the confines of said housing, said terminal portion having on the outer periphery thereof a plurality of cooling fins formed integrally therewith; a self-sealing septum on said terminal portion closing off the tube; and an apertured retaining member having on the periphery thereof a plurality of cooling fins formed integrally therewith, said retaining member fixing the septum in its closing off relation to the tube whereby for purposes of charging a sample to the tube, a hypodermic needle may be inserted through the aperture of the retaining member and pierce the septum, the outlet port being formed by: a terminal portion of the tube extending beyond the confines of the housing; a self-sealing septum on said outlet terminal portion closing off the tube; an apertured retaining member fixing the septum in its closing off relation to the tube; and a hollow needle extending through the aperture of said outlet retaining member piercing the septum to provide a needle termination structure at the outlet port.

5. The apparatus of claim 4 wherein an apertured spacer extends inside the tube from the septum at the charging port to a location adjacent the termination of the hydrogen supply line and wherein the outlet port terminal portion of the tube is reduced in diameter from just inside the housing to the outlet port septum, whereby free space inside the tube not adapted to be occupied by heated catalyst is minimized.

References Cited

UNITED STATES PATENTS

| | | | |
|---|---|---|---|
| 1,452,594 | 4/1923 | Claude | 23—288 |
| 1,870,665 | 8/1932 | Audibert | 23—288 |
| 1,920,886 | 8/1933 | Pier et al. | |
| 2,083,521 | 6/1937 | Miller | 23—255 X |
| 2,345,090 | 3/1944 | Brace | 23—255 X |
| 2,615,062 | 10/1952 | Craig | 23—288 X |
| 3,067,017 | 12/1962 | Du Chaffaut | 23—288 X |

JOSEPH SCOVRONEK, *Primary Examiner.*